US006085182A

United States Patent [19]

Cordery

[11] Patent Number: 6,085,182

[45] Date of Patent: Jul. 4, 2000

[54] METHOD AND APPARATUS FOR CANCELING POSTAGE

[75] Inventor: Robert A. Cordery, Danbury, Conn.

[73] Assignee: Pitney Bowes Inc., Stamford, Conn.

[21] Appl. No.: 08/996,599

[22] Filed: Dec. 23, 1997

[51] Int. Cl.[7] .......... G06F 17/00

[52] U.S. Cl. .......... 705/408

[58] Field of Search .......... 705/401, 408, 705/410; 101/71; 283/71; 382/101; 235/468

[56] References Cited

U.S. PATENT DOCUMENTS

| | | | |
|---|---|---|---|
| 3,983,366 | 9/1976 | Gunn | 235/491 |
| 3,995,741 | 12/1976 | Henderson | 235/487 |
| 4,725,718 | 2/1988 | Sansone et al. | 235/495 |
| 5,072,400 | 12/1991 | Manduley | 705/407 |
| 5,308,932 | 5/1994 | Manduley et al. | 705/408 |
| 5,502,304 | 3/1996 | Berson | 235/468 |

*Primary Examiner*—Emanuel Todd Voeltz
*Assistant Examiner*—Thomas A. Dixon
*Attorney, Agent, or Firm*—Steven J. Shapiro; Michael E. Melton

[57] ABSTRACT

An apparatus for canceling mailpieces includes structure for transporting the mailpieces through the apparatus; a printing device; a device for detecting the presence and location of a postage indicium on a first one of the mailpieces, the postage indicium having a machine readable portion; and a controller, operatively in communication with the printing device and the detecting device, for receiving detection data from the detecting device and for causing the printing device to print a postage indicium cancellation mark on the first mailpiece relative to the postage indicium such that the postage indicium cancellation mark does not degrade the readability of the machine readable portion. A method corresponds to operation of the apparatus.

20 Claims, 3 Drawing Sheets

METHOD AND APPARATUS FOR CANCELING POSTAGE

BACKGROUND OF THE INVENTION

This invention relates to postage cancellation machines, and more particularly to a postage cancellation machine which cancels a postage indicium printed on a mailpiece.

Postage meters which print an indication of postage value, commonly referred to as an indicium, have been utilized throughout the twentieth century as an alternative to the use of either permit mail or postage stamps. Typically, older postage meters used a rotary drum with a printing die thereon as the means for printing the indicium. However, modern postage meters are now incorporating digital printing technology, such as ink jet printing, as a replacement for the older rotating drum/printing die technology primarily for its reduced cost and adaptability to print different images via simple software changes within the postage meter.

Digital printing technology very easily accommodates the printing of data within the indicium that can vary from mailpiece to mailpiece such as the date of printing, the postage amount, and the mailpiece count number. Because of the ability to easily print variable data utilizing digital printing techniques, both meter manufacturers and postal authorities worldwide have recognized that encrypted data which is unique to each individual mailpiece indicium can be included in the printed indicium and subsequently used to verify the authenticity of each printed indicium. That is, a unique encrypted data set can be created and printed as part of each indicium utilizing data elements contained within the indicium, such as postage amount, date of printing, and meter serial number, which data elements serve as input data to known encryption algorithms which in turn produce the unique encrypted data set. Subsequent to the printing of the indicium the postal authority can use conventional scanning equipment and associated software to scan and read the indicium using normal mailpiece pro sing to obtain the data elements and verify a unique encrypted data set based on the scanned data elements. Since the encryption algorithms utilized by the postal authority at its verification facility would be the same as those used in the meter, the encrypted data elements on the mailpiece should match that produced by the postal authority if the indicium is authentic.

Assuming that the verification is successfully completed, the indicium information for each mailpiece can be stored in a postal authority data base. Thus, if a second mailpiece having the same indicium printed thereon is subsequently verified by the postal authority and compared to the data base, it will be flagged as likely being a fraudulent (i.e copied) indicium.

The above discussed verification system generally is effective except that even if a particular indicium is designated as being authentic but already included in the verification data base there is no way of determining if the indicium is a fraudulent copy of a valid indicia or simply a valid indicia being scanned for a second time. That is, as an individual mailpiece is being processed it might be sent through various postal processing facilities. If the indicium is scanned at each facility, the same valid indicium will be identified as a redundant entry into the verification data base at each scanning facility it is processed through subsequent to its scanning at a first scanning facility. While to some degree this situation could be improved by only performing verification at selected major processing facilities, a problem would still exist for mail processed between major processing facilities relative to distinguishing at those facilities mailpieces which came from another major verification processing facility.

The use of fraudulent indicia (either a reused or a copied valid indicia) has always been considered a problem by postal authorities. In the stamp environment, this problem has partially been solved by the printing of a cancellation mark over a stamp using a conventional facer/canceler machine. The cancellation mark provides a visual indication that the postage stamp has ready been used thereby preventing its reuse. However, such cancellation marks have not historically been used to cancel postal indicium. Moreover, if a cancellation mark were to be imprinted over an indicium, it would interfere with the machine readability of the data in the indicium thereby possibly preventing verification of the encrypted data elements. Moreover, some of the verification systems proposed to date require destination information to be included as part of the indicium. This destination information is machine readable and thus can be automatically scanned and read during mailpiece processing thereby shortening mailpiece processing time. However, if a cancellation mark were printed over the indicium, it would prevent the accurate machine readability of the destination data precluding its use to expedite mailpiece processing.

The failure to cancel postage indicium however, presents a problem for many postal authorities in connection with their ability to properly evaluate their performance from a mailpiece processing timeframe viewpoint. For example, the Unites States Postal Service compares the date a destination post office receives a mailpiece to the printing date in the indicium to determine mailpiece processing time. However, if the indicium is printed on a mailpiece but not deposited with the originating post office for several days thereafter, the calculated mailpiece processing time will be longer than the actual processing time. This problem is likely to increase with the introduction of low cost meter products which are geared for the small office/home office environment (SOHO). It is anticipated that the typical user in the SOHO environment is much more likely to have a time gap between indicium printing and mailpiece deposit since they don't have a dedicated mailroom and trips to the post office generally occur on a not to interfere basis.

SUMMARY OF THE INVENTION

It is thus an object of the invention to provide an apparatus and method for canceling a postage indicium on a mailpiece which provides the inherent benefits of cancellation while not adversely impacting the machine readability of machine readable components of the postage indicium.

The above object is met by providing an apparatus for canceling mailpieces which includes structure for transporting the mailpieces through the apparatus; a printing device; a device for detecting the presence and location of a postage indicium on a first one of the mailpieces, the postage indicium having a machine readable portion; and a controller, operatively in communication with the printing device and the detecting device, for receiving detection data from the detecting device and for causing the printing device to print a postage indicium cancellation mark on the first mailpiece relative to the postage indicium such that the postage indicium cancellation mark does not degrade the readability of the machine readable portion. A method corresponds to operation of the apparatus.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explaining principles of the invention.

DETAILED DESCRIPTION OF THE PREFERRED EMBODIMENTS

Figure 1:
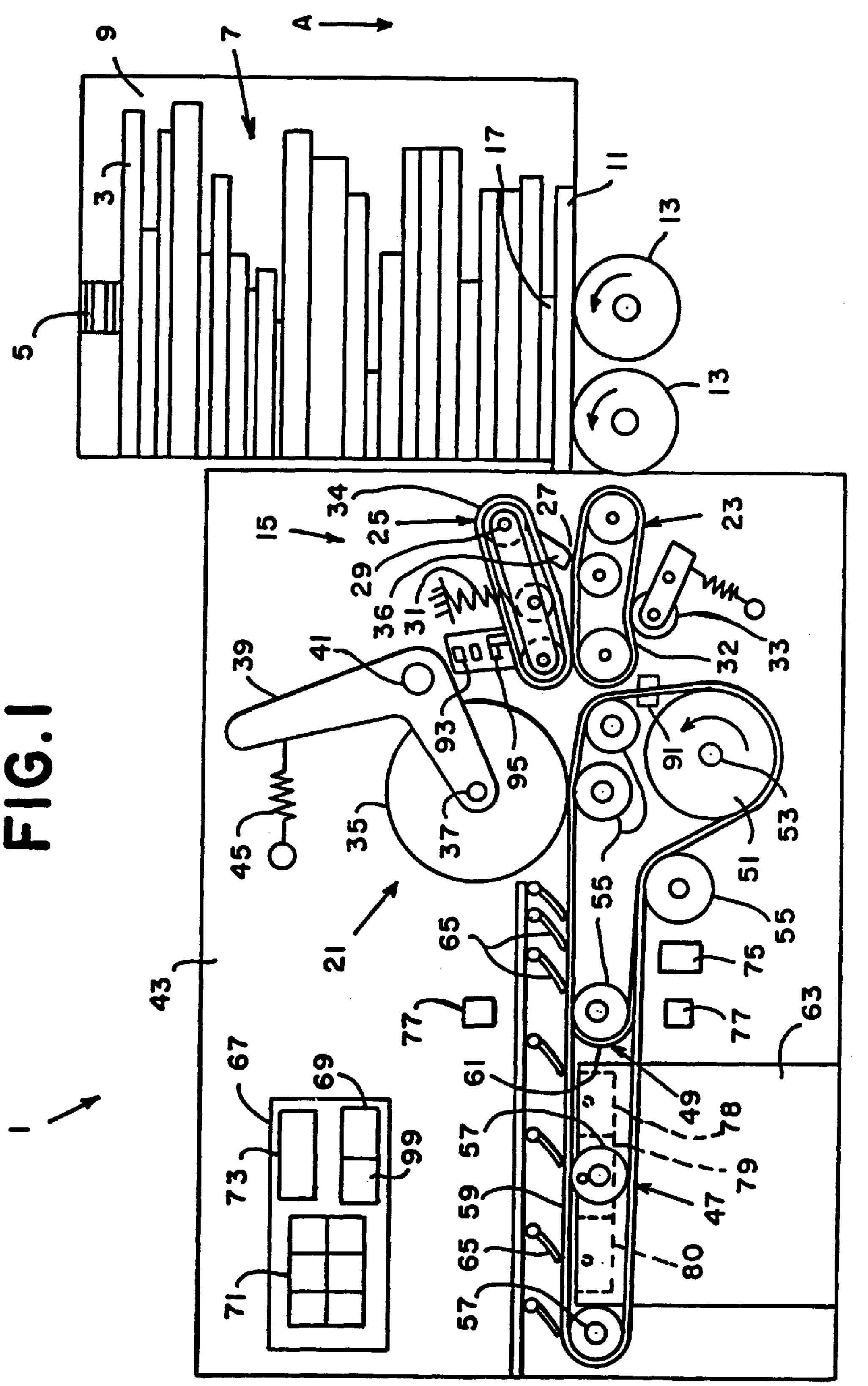
FIG. 1 is a plan view of the inventive cancellation machine.

Referring to FIG. 1, the inventive mixed mail cancellation machine is shown at 1. The mixed mail cancellation machine 1 includes a stack advance mechanism consisting of a paddle 3 connected to a driven continuous belt 5. The belt 5 moves in the direction of Arrow "A" taking the paddle 3 therewith. A stack of mixed mailpieces (mailpieces of varying size and weight) 7 rests against paddle 3 and on top of a deck 9. The individual mailpieces of the stack 7 are placed to stand on edge such that as the paddle 3 moves in the direction "A" the entire stack of mail 7 is also forced to move in that same direction. The lead mailpiece 11 is forced by the advancing paddle 3 into contact with four nudger rollers 13 that are each driven into rotation in the counterclockwise direction of FIG. 1. When the lead mailpiece 11 contacts the driven nudger rollers 13, they feed the lead mailpiece 11 away from stack 7 and toward a singulating apparatus 15. It is important to note that as the nudger rollers 13 continue to feed the lead mailpiece 11 toward the singulating apparatus 15, the next mailpiece 17 is also fed toward singulating apparatus 15. However, at this point in time, typically the first and second mailpieces 11, 17 are in an overlapped (shingled) relationship with respect to each other. The singulating apparatus 15 then separates the lead mailpiece 11 from the next mailpiece 17 so that only individual mailpieces leave the singulating device 15 for transport downstream by a take away transport structure 21 which is described in more detail below.

Singulating apparatus 15 includes a feed belt assembly 23 and a reverse belt assembly 25 which define a nip 27 therebetween into which the mailpieces from the stack of mixed mail 7 are fed by the nudger rollers 13. The feed belt assembly 23 is fixed in place to provide a registration surface for the individual mailpieces while the reverse belt assembly 25 is free to rotate about a fixed shaft 29 to accommodate the varying thickness of mailpieces entering nip 27. The reverse belt assembly 25 is biased toward the feed belt assembly 23 by a spring 31. Moreover, tension on the individual belts of feed belt assembly 23 is maintained by a plurality of corresponding tensioning rollers 33. The feed belt assembly 23 includes three feed belts 32, while the reverse belt assembly 25 includes two reverse belts 34. Moreover, spring loaded fingers 36 assist with the ingestion of the mailpiece into nip 27. Further details of the stack advance mechanism, the nudger rollers 13, and the singulating apparatus 15 are fully described in U.S. Pat. Nos. 5,971,391 and 6,003,857 both of which are hereby incorporated by reference. The above discussed components act together to ensure that each individual mailpiece is ultimately separated from the stack 7 and fed individually out of the singulating apparatus 15 to the take away transport structure 21.

Figure 2:
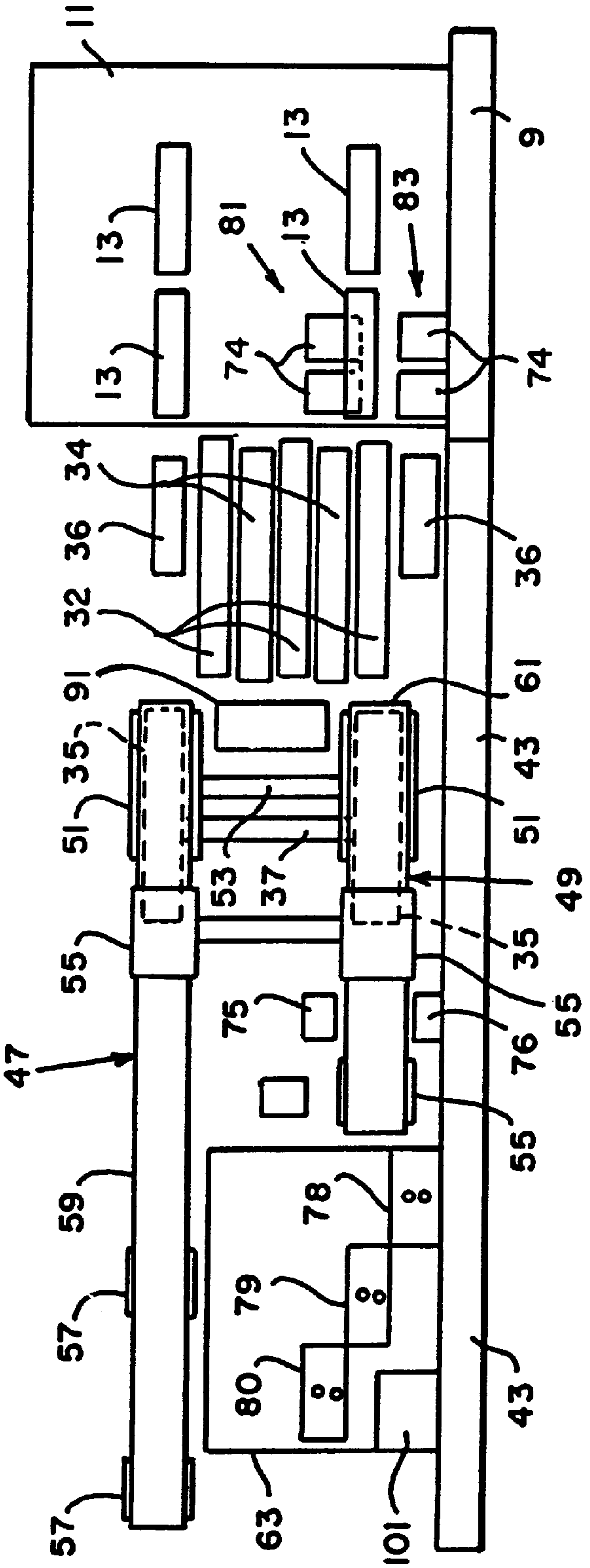
FIG. 2 is a side view of FIG. 1.

Transport structure 21 includes a pair of large idler rollers 35 mounted for free rotation about a shaft 37 fixedly disposed in lever bracket 39. Lever bracket 39 is pivotally mounted on a shaft 41 extending from feed deck 43. The take away rollers 35 are biased toward the feed path of the mailpieces by a spring 45 fixedly connected to deck 43. Directly opposite each of the take away rollers 35 are respective belt transport assemblies 47 and 49. Each of the belt transport assemblies 47/49 include a driven pulley 51 which is driven by a motor (not shown) connected to a common shaft 53 on which each driven pulley 51 is fixedly mounted. Each belt transport assembly 47, 49 further includes a plurality of idler pulleys 55. Belt transport assembly 47 further includes two additional idler pulleys 57. A first continuous belt 59 is disposed around a first driven pulley 51 and each of the corresponding idler pulleys 55 and 57. A second continuous belt 61 is disposed around another one of the driven pulleys 51 and each of its corresponding idler pulleys 55. As noted in FIG. 2, the length of the belt 61 is less than the length of belt 59 in order to permit a print head 63 to either print a cancellation mark on the stamps of each of the individual mailpieces or to print a cancellation mark for a mailpiece having a postage indicium printed thereon in lieu of stamps, as will be discussed in more detail below. The additional idler pulleys 57 are required by the top belt transport assembly to effectively transport individual mailpieces through the full extent of belt 59 and past printhead 63.

Directly opposing each of the belts 59, 61 are a series of spring loaded skis 65. The individual mailpieces leave singulating apparatus 15, are ingested into the nip between the take away rollers 35 and each of the belts 59, 61, and transported downstream toward the printing mechanism 63. As the mailpiece is transported from the take away rollers 35 it is ingested between each of the skis 65 and the belts 59, 61 for continued transport downstream toward the printing mechanism 63. At the point where the first belt 61 ends, only skis 65 associated with the top second belt 59 are utilized to transport the mailpiece past the printing mechanism 63. As the individual mailpiece is transported past the printing mechanism 63 a cancellation mark is printed over each of the stamps or alternatively a cancellation mark for a mailpiece having a postage indicium in lieu of stamps is printed in a manner to be described in more detail below.

Mounted on feed deck 43 is a control panel 67. Control Panel 67 includes a microprocessor 69, a keyboard 71, and a display 73. Microprocessor 69 controls the operation of the cancellation machine 1 while keyboard 71 and display 73 permit communication between the microprocessor 69 and an operator of cancellation machine 1.

A pair of photoelectric scanning devices 75/76 are positioned along the mailpiece feed path for the purpose of detecting if stamps are present on each individual mailpiece being processed. These scanning devices 75/76 are designed to illuminate and detect a specific ink (such as a phosphorescent ink) associated with printed stamps. For example, lead mailpiece 11 is shown as having a plurality of phosphorescent stamps 74 attached thereon. As mailpiece 11 is transported past the scanning devices 75/76, the stamps 74 are illuminated by the scanning devices 75/76. The presence of stamps is detected by the scanning devices 75/76 detecting the illuminated light that the stamps emit back. Microprocessor 69 receives signals from sensors 75/76 indicative that the mailpiece 11 has stamps 74 thereon. Subsequently, when the lead edge of mailpiece 11 is detected by a conventional through-beam sensor 77, microprocessor 69 controls the energizing of three ink jet printheads 78, 79 and 80 in a known manner to print a cancellation mark across the stamps 74 as they are transported thereby. Alternatively, if the sensors 75/76 do not detect the presence of a stamp 74 (and if a postage indicium is not detected as described below), microprocessor 69 does not cause the printheads 78, 79 and 80 to print the cancellation mark, but operates a diverter (not shown) positioned downstream from the printing mechanism 63 to divert these mailpieces to a separate bin for subsequent special processing.

The use of two sensors 75/76 are shown for the purpose of associating each row of stamps 81, 83 with a corresponding one of the sensors 75/76. That is, different sizes of mailpieces will typically have one or two rows of stamps placed thereon. For example, a common letter sized envelope would only have a single row of stamps while a large 9" by 12" flat would typically have two rows of stamps. By associating each sensor 75/76 with a respective one of the rows of stamps 81/83, information is sent from the sensors 75/76 to microprocessor 69 indicative of the number of rows of stamps. Based on this information, microprocessor 69 can selectively energize only the required number of printheads 78, 79, 80 needed to print a cancellation mark over the particular number of rows of stamps sensed. This reduces the amount of ink consumed as compared to always printing a cancellation mark large enough to cover the maximum anticipated number of rows of stamps that could be present on any individual mailpiece in the stack of mixed mail 7.

Figure 3:
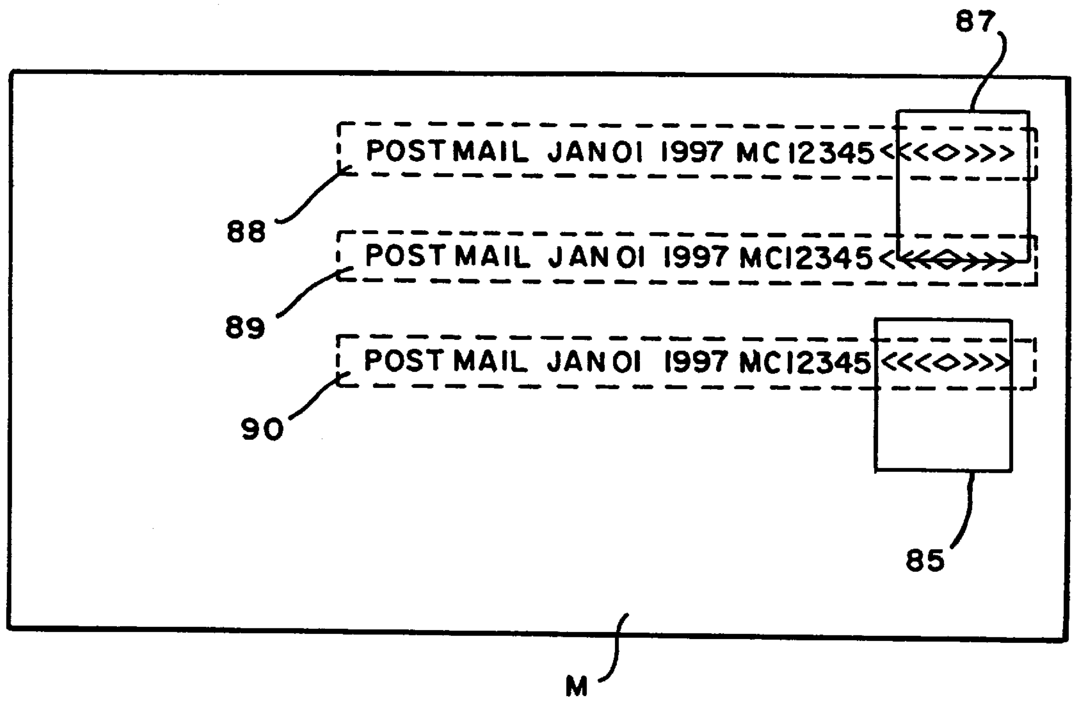
FIG. 3 is a mailpiece cancellation mark applied to stamps on a mailpiece by the apparatus of FIG. 1.

FIG. 3 shows a sample cancellation mark that can be applied to a mailpiece "M" in the inventive apparatus. As noted, mailpiece "M" has two rows of stamps 85, 87. Thus, when the sensors 75, 76 15 respectively detect each row of stamps 85, 87, each of the printheads 78, 79, 80 will be energized to print a respective cancellation mark 88, 89, 90. Cancellation marks 88, 89 effectively cancel the first row of stamps 87 while cancellation mark 90 effectively cancels the bottom row of stamps 85. In the preferred embodiment, cancellation marks 88, 89 would always be printed since the incoming stack of mixed mail 7 has the individual mailpieces positioned upside down on edge with the stamps facing the nudger rollers 13. That is, since the upper right hand corner of the mailpiece is the typical required position to attach stamps, both small and large size mailpieces having stamps will trigger the bottom sensor 76. However, normally, only large mailpieces will require two rows of stamps such that if the top sensor 75 does not detect a second row of stamps, the cancellation mark 90 will not be printed.

It is important to note that while the above described embodiment requires the mailpieces to be positioned as discussed above relative to the sensors 75, 76, the machine could be set up to print cancellation marks on either side of the mailpiece by providing a printing mechanism 63 and sensors 75/76 on both sides of the mailpiece feed path. This drives up the cost of the machine and still requires that the mailpieces be positioned on the stack advance feed deck 9 with their top edge down.

Figure 4:
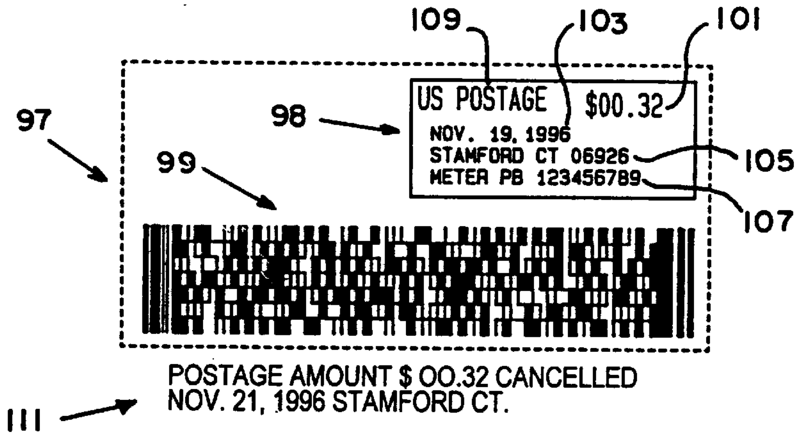
FIG. 4 is a postage indicium together with a postage indicium cancellation mark applied to mailpieces by the apparatus of FIG. 1.

As previously discussed, mailpieces often include an indicium thereon in lieu of stamps to indicate the payment of postage required for mailing the mailpiece. A typical indicium proposed for use by the United States Postal Service is shown in FIG. 4 at 97. Indicium 97 is comprised of a first portion 98 which is data that is human and machine readable and a second portion 99 which is an encrypted 2D bar code. First portion 98 includes the postage value 101, the date of printing of the indicium 103, data indicative of the mailing origin 105, the postage meter serial number 107, and additional verbiage (or graphics, or a combination thereof 109. The encrypted bar code 99 includes the postage amount, the meter serial number, a customer identification, a date of mailing, originating address information, destination delivery point information, ascending and descending register information and an encrypted signature which is generated utilizing at least some of the data stored in the second portion 99. As previously discussed, the authenticity of the printed indicium 97 is accomplished by reading data in the indicia 97 at a verification center and verifying the correctness of the digital signature in the bar code 99.

In view of the above, it is readily apparent that the stack of mixed mail 7 may include both stamped mailpieces and mailpieces with an indicium thereon. Accordingly, the postage cancellation machine 1 includes a conventional scanner 91, such as a linear charged coupled device, which is used to detect and identify the relative position of the indicium 97 on a mailpiece being processed through the postage cancellation machine 1. Scanner 91 creates an image of the indicium 97 which is analyzed via conventional software stored in microprocessor 69 to identify the boundaries of the indicium 97 relative to the lead and top or bottom edges of the mailpiece. Once this information has been determined, microprocessor 69 controls the printhead 63 to selectively energize the required printheads 80, 79, and 78 to print the indicium cancellation mark 111 of FIG. 4 taking into account the velocity the at which the mailpieces are processed through the postage cancellation machine 1 and the detection of the lead edge of each mailpiece by sensor 77.

The cancellation mark 111 shown in FIG. 4 is a simple message that is both human readable and machine readable. The human readability of mark 111 is important because it permits a postal worker to immediately recognize if an attempt has been made to reuse a bar code from a previously used indicium 97 (i.e. cut and glued to a new mailpiece). The machine readability of the cancellation mark 111 is even more important because it can be read by the same verification scanners utilized to authenticate the indicium 97 and stored in the verification data base to provide an indication that the particular indicium 97 has previously been verified. Thus, if a fraudulent copied indicium is introduced into the mail processing stream subsequent to the verification and authentication of the authentic original indicium, it is easily detected as being fraudulent because it will not have a cancellation mark associated therewith. Moreover, an authentic indicium 97 which is processed at a plurality of postal locations will be recognized as being valid and cancelled at each location subsequent to the initial location at which it was originally verified.

The cancellation mark 111 is also shown in FIG. 4 as being printed outside the boundaries of the indicium 97. The positioning of the cancellation mark 111 is important because information in the barcode 99, such as destination delivery point information, may still need to be scanned and read at various post offices in the mail processing stream subsequent to cancellation. Accordingly, the cancellation mark must be printed so as not to negatively affect the machine readability of the indicium 97 data. It is also possible that certain post offices will have a cancellation capability but not a verification scanner. Thus, in this situation, the data in the barcode needs to be scanned ana read to permit verification to occur later on in the mail processing stream.

Cancellation mark 111 is shown in the preferred embodiment as including the postage amount and the date of cancellation. The purpose of including the postage amount, which is obtained during the scanning process by reading the postage amount data contained in the barcode 99, is that it provides a visual correlation between the postage amount 101 and the postage amount stored in the barcode 99. If these values do not match, it provides an indication that a problem exists in the specific postage meter or that some type of tampering with the indicium has occurred. Furthermore, by providing the date of cancellation, the postal authority can now more accurately determine the processing time associated with delivery of mailpieces having an indicium 97 thereon. For example, in FIG. 4, indicium 97 was printed on Nov. 19, 1996 but was not delivered to the post office until Nov. 21, 1996. Thus, when calculating postal processing, the two day delay between printing and receipt by the post office is easily ascertained.

While the cancellation mark 111 is shown as being machine and human readable, it could for example be only machine readable. Additionally, the cancellation mark 111 does not have to include the data shown but can include other data or simply be a symbol indicative of cancellation. Furthermore, microprocessor 69 can include both known character reader software and barcode reader software which would allow it to not only identify the position of the indicium 97 on the mailpiece but to also obtain all of the data contained in the indicium 97. Thus, verification and cancellation could concurrently be accomplished. Moreover, microprocessor 69 could also include unique encrypted data within the cancellation mark 111 which is based on the scanned indicium 97 data. This encrypted data can subsequently be verified at other postal locations to prevent the use of fraudulent cancellation marks.

As discussed above, it is important that the cancellation mark 111 be printed so as not to negatively affect the machine readability of the indicium 97 data. Accordingly, alternate possibilities of cancellation mark positioning include placing the cancellation mark 111 over a part of the indicium 97 which does not need to be read such as the data block 107 and printing the cancellation mark 111 over the indicium in invisible ink such that both the indicium 97 data and the cancellation mark 111 are both still readable when illuminated by the proper corresponding light sources.

The above described cancellation system includes both a stamp cancellation device, an indicium cancellation device, and a verification system. However, various combinations of the subsystems can be combined to form a different type of system or the individual subsystems can operate independently. Of course, in the preferred embodiment shown, since the printed indicium 97 and stamps 74 typically utilize different inks which respond in different ways to different wavelengths of illuminating light, the inventive apparatus sensors 75/76 and 91 easily distinguish between the stamps 94 and the indicium 97 so that the proper cancellation mark is always printed on the mailpiece.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims. For example, while a preferred mixed mail on edge mail handling postage cancellation machine has been shown, the inventive cancellation structure can also be incorporated in conventional stamp facer/canceler machines.

What is claimed is:

1. A method for canceling a mailpiece having a postage indicium thereon that includes an indication of a postage amount, the postage indicium including a first portion that is only machine readable, the method comprising the steps of:

detecting the presence of the postage indicium; and printing a cancellation mark on the mailpiece relative to the postage indicium so that the cancellation mark does not degrade the machine readability of the first portion of the postage indicium.

2. A method as recited in claim 1, wherein during printing the cancellation mark is printed on the mailpiece outside of an area defined by the postage indicium.

3. A method as recited in claim 1, wherein the cancellation mark is both human readable and machine readable.

4. A method as recited in claim 1, wherein the cancellation mark includes the date of printing of the cancellation mark.

5. A method as recited in claim 3, wherein the postage indicium includes a second portion that is both machine and human readable and both the first and second portions include the postage amount and further comprising obtaining the postage amount from the first portion and including in the cancellation mark the postage amount obtained from the first portion to provide a visual consistency check between the postage amount included in the first and second portions.

6. A method as recited in claim 1, wherein the cancellation mark includes encrypted data indicative of the authenticity of the cancellation mark.

7. A method as recited in claim 2, wherein the cancellation mark is only machine readable.

8. A method as recited in claim 1, wherein during printing the cancellation mark is printed in invisible ink over the postage indicium such that both the cancellation mark and the first portion of the postage indicium are machine readable.

9. A method as recited in claim 1 wherein the first portion of the postage indicium includes an indicium signature and further comprising reading the first portion of the postage indicium and verifying the indicium signature.

10. A method as recited in claim 1, wherein the first portion is a barcode.

11. An apparatus for canceling mailpieces comprising:

means for transporting the mailpieces through the apparatus;

a printing device;

means for detecting the presence and location of a postage indicium on a first one of the mailpieces, the postage indicium having a first portion that is only machine readable and also including an indication of a postage amount; and control means, operatively in communication with the printing device and the detecting means, for receiving detection data from the detecting means and for causing the printing device to print a postage indicium cancellation mark on the first mailpiece relative to the postage indicium such that the postage indicium cancellation mark does not degrade the readability of the first portion.

12. An apparatus as recited in claim 11, further comprising means for sensing the presence of a postage stamp on a second one of the mailpieces, and wherein the control means is in communication with the sensing means such that at times when the sensing means provides an indication to the control means of the presence of the postage stamp the control means causes the printing device to print a stamp cancellation mark over the postage stamp.

13. An apparatus as recited in claim 12, further comprising means for scanning and reading the first portion and for verifying the authenticity of the postage indicium based on data in the first portion.

14. An apparatus as recited in claim 11, wherein the postage indicium cancellation mark is printed on the first one of the mailpieces outside of a boundary defined by the postage indicium.

15. An apparatus as recited in claim 11, wherein the postage indicium cancellation mark is both human readable and machine readable.

16. An apparatus as recited in claim 11, wherein the postage indicium cancellation mark includes the date of printing of the postage indicium cancellation mark.

17. An apparatus as recited in claim 15, further comprising means for reading the first portion and wherein the first portion includes the postage amount, a second portion of the postage indicium is human readable and includes the postage amount and the postage indicium cancellation mark includes the postage amount obtained from reading the first portion to provide a visual consistency check between the postage amount in the first and second portions.

18. An apparatus as recited in claim 11, wherein the postage indicium cancellation mark includes encrypted data indicative of the authenticity of the postage indicium cancellation mark.

19. An apparatus as recited in claim 11, wherein the postage indicium cancellation mark is only machine readable.

20. An apparatus as recited in claim 11, wherein the postage indicium cancellation mark is printed in invisible ink over the postage indicium such that both the postage indicium cancellation mark and the first portion of the postage indicium are machine readable.

* * * * *